US012574293B2

(12) United States Patent
Sadeghi et al.

(10) Patent No.: US 12,574,293 B2
(45) Date of Patent: Mar. 10, 2026

(54) MANAGING CLOUD-NATIVE VIRTUAL NETWORK FUNCTIONS

(71) Applicant: Microsoft Technology Licensing, LLC, Redmond, WA (US)

(72) Inventors: Bahareh Sadeghi, Vancouver, WA (US); Michael Anthony Brown, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

(21) Appl. No.: 18/076,219

(22) Filed: Dec. 6, 2022

(65) Prior Publication Data

US 2023/0412466 A1 Dec. 21, 2023

Related U.S. Application Data

(60) Provisional application No. 63/352,875, filed on Jun. 16, 2022.

(51) Int. Cl.
| | |
|---|---|
| *H04L 41/122* | (2022.01) |
| *H04L 41/40* | (2022.01) |
| *H04W 4/50* | (2018.01) |
| *H04W 24/10* | (2009.01) |

(52) U.S. Cl.
CPC ........... *H04L 41/122* (2022.05); *H04L 41/40* (2022.05); *H04W 4/50* (2018.02); *H04W 24/10* (2013.01)

(58) Field of Classification Search
CPC ... G06F 9/541; G06F 9/5072; H04L 41/0895; H04L 41/0843; H04L 67/10; H04L 67/141; H04L 67/12; H04L 61/5076; H04L 12/66; H04L 41/0894; H04L 41/0803; H04M 15/66
See application file for complete search history.

(56) References Cited

U.S. PATENT DOCUMENTS

| | | | | |
|---|---|---|---|---|
| 2013/0291121 | A1* | 10/2013 | Iovanov | G06F 9/541 |
| | | | | 726/28 |
| 2019/0140895 | A1* | 5/2019 | Ennis, Jr. | H04L 12/66 |
| 2022/0086218 | A1* | 3/2022 | Sabella | H04M 15/66 |
| 2022/0353138 | A1* | 11/2022 | Wyszkowski | H04L 41/084 |

OTHER PUBLICATIONS

"Discussion Paper on Deployment of cloud-native VNFs", In Proceedings of 3GPP TSG-SA5 Meeting #143-e, S5-223437, May 9, 2022, 4 Pages.

(Continued)

*Primary Examiner* — Mahran Y Abu Roumi
(74) *Attorney, Agent, or Firm* — Ray Quinney & Nebeker P.C.; James S. Bullough

(57) ABSTRACT

The present disclosure generally relates to systems, methods, and computer-readable media for managing cloud-native virtual network functions (CNFs) in a telecommunication network environment. The systems described herein involve specifying an architecture for a telecommunication network management system that facilitates integration with a variety of cloud-native management solutions while also minimizing impact to existing service-based management architectures (SBMA) of fifth generation (5G) operations administration and management (OAM) systems.

17 Claims, 5 Drawing Sheets

(56) References Cited

OTHER PUBLICATIONS

"Introduction of Indirect Communication between NF Services, and Implicit Discovery", In Proceedings of 3GPP TSG-SA2 Meeting #131, S2-1902051, Feb. 25, 2019, 17 Pages.

"PCR 28.834 Add Use Case on Cloud-native VNF Deployment", In Proceedings of 3GPP TSG-SA5 Meeting #143-e, S5-223444, May 9, 2022, 2 Pages.

"PCR 28.834 Add use case on LCM: Modification of cloud-native VNFs using Defacto Standards", In Proceedings of 3GPP TSG-SA5 Meeting #144-e, S5-224310, Jun. 27, 2022, 02 Pages.

"International Search Report and Written Opinion Issued in PCT Application No. PCT/US23/019551", Mailed Date: Jul. 31, 2023, 16 Pages.

* cited by examiner

600

MANAGING CLOUD-NATIVE VIRTUAL NETWORK FUNCTIONS

CROSS REFERENCE TO RELATED APPLICATIONS

This application claims benefit and priority to U.S. Application No. 63/352,875, filed on Jun. 16, 2022, the entireties of which are incorporated herein by reference.

BACKGROUND

A cloud computing system refers to a collection of computing devices capable of providing remote services and resources. Indeed, cloud computing systems can provide a variety of services including storage, databases, networking, software, and analytics services. The use of cloud computing technology has grown rapidly in recent years. This is due at least in part to the development of high-capacity networks as well as reduced costs for computers and storage devices.

Broadly speaking, a cloud computing system includes two sections, a front end and a back end, that are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet. A "hybrid cloud" architecture is the combination of public and private clouds by a wide area network or broadband connection.

There are many different types of services that cloud computing providers can offer to customers. One type of cloud computing service is referred to as Infrastructure as a Service (IaaS). IaaS is a form of cloud computing that delivers compute, network, and storage resources to consumers on-demand, over the Internet. IaaS enables end users to scale and shrink resources on an as-needed basis, reducing the need for large, up-front capital expenditures. This can be particularly beneficial for users who anticipate having variable workloads.

The subject matter in the background section is intended to provide an overview of the overall context for the subject matter disclosed herein. The subject matter discussed in the background section should not be assumed to be prior art merely as a result of its mention in the background section.

Similarly, a problem mentioned in the background section or associated with the subject matter of the background section should not be assumed to have been previously recognized in the prior art.

DETAILED DESCRIPTION

Figure 1:
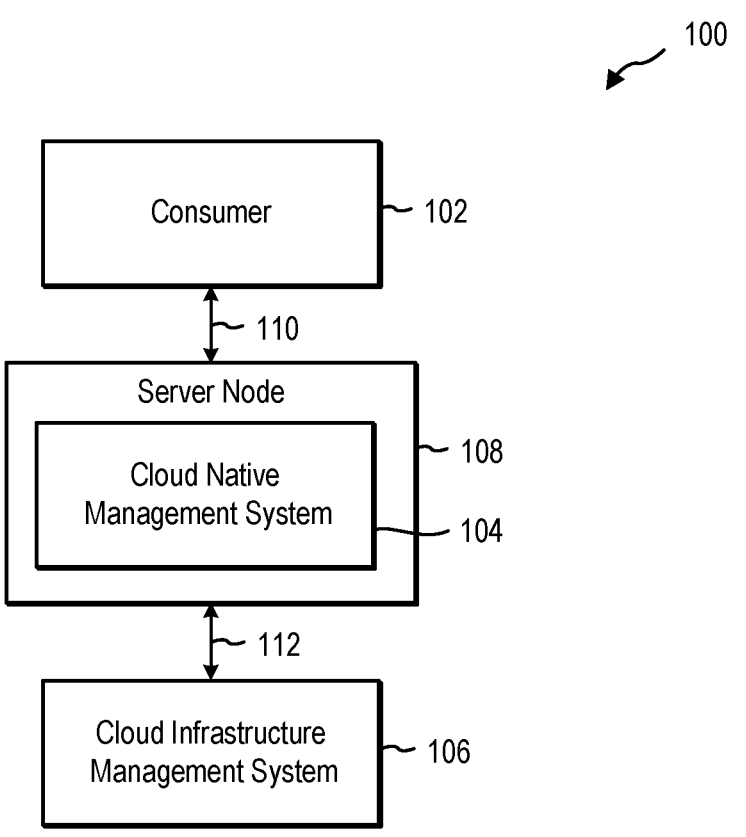
FIG. 1 illustrates an example environment including a CNSM producer implemented on a telecommunication network management system in accordance with one or more embodiments.

The present disclosure generally relates to systems, methods, and computer-readable media for managing cloud-native virtual network functions (CNFs) implemented in a telecommunication environment (e.g., a $3^{rd}$ Generation Partnership Project (3GPP) environment). The systems described herein involve specifying an architecture for a telecommunication network management system (such as 3GPP defined management system) that facilitates integration with a variety of cloud-native management solutions while also minimizing impact to existing service-based management architectures (SBMA) of fifth generation (5G) operations administration and management (OAM) systems.

5G Service Based Architecture (SBA) is based on technologies known from the internet, i.e., the Service-Oriented Architecture (SOA) and Representational State Transfer (REST). SOA consists of the three components Service Repository, Service Consumer and Service Provider. A Service Producer publishes its service(s) to the Service repository and a Service Consumer queries the Service Repository for a Service Provider for a specific Server. Then the Service Consumer queries or subscribes to events of the requested service. Network Functions (NF) of SBA can act according to one or more roles of the three and, depending on the NF, they can consume a service from one NF but notify other NFs as a producer at the same time. SBA in 5G defines a variety of NFs, including (by way of example): Access and Mobility management Function (AMF), Session Management Function (SMF), User Plane Function (UPF), Policy Control Function (PCF), Network Exposure Function (NEF), Network Repository Function (NRF), Unified Data Management (UDM), Unified Data Repository (UDR), Authentication Server Function (AUSF), Application Function (AF), Network Slice Selection Function (NSSF).

Iterations of 3GPP SA (e.g., 3GPP SA5) have started a study item on management of cloud-native virtual network functions (referred to herein as "CN VNFs" or "CNFs"). The goal of this study item is to identify the gaps in 3GPP management system for management of CNFs compared to the management of VNFs; management of VNFs in 3GPP telecommunication network system relies on deployment of a variety of standards. (e.g., ETSI's NFV MANO). ETSI NFV MANO framework has deficiencies, making it heavy and cumbersome to deploy. Furthermore, the NFV MANO framework has a large overhead, and it is not efficient for managing decentralize infrastructure. ETSI NFV MANO framework often requires the consumers to select a specific Application Programming Interface (API) based on the service they request. ETSI NFV MANO was build to manage VNFs, and hence it has gaps when it comes to management of cloud-native network functions (CN VNF).

While cloud-native network functions (NFs) can be managed by use of conventional standards with some modifications, there are additional solutions for management of cloud-native NFs that need to be supported by 3GPP systems. For example, widely deployed and used solutions for management of cloud-native applications, such as Kubernetes and Helm charts among others need to be supported by 3GPP systems. These widely deployed and used solutions are referred to herein as de-facto standards for management of cloud-native applications and can be used for management of CNFs.

As will be discussed in further detail herein, one or more embodiments of a telecommunication network cloud-native management system (CNSM) producer provides a solution to facilitate support for these and other solutions for management of cloud-native NFs. Indeed, features and functionality of one or more embodiments of the CNSM producer (or simply "CNSM" or "CNSM proxy") may specify an architecture for telecommunication network management system that enables seamless integration with a variety of cloud-native management solutions while minimizing the impact to the existing Service Based Management Architecture (SBMA) of 5G OAM system.

In one or more embodiments, the CNSM producer (referred to in some implementations as simply "CNSM" or a "CNSM proxy") involves a new entity introduced for management of cloud-native NFs in 3GPP SBMA for interaction with cloud infrastructure management system (CIMS, or simply "cloud infrastructure," in some implementations). This CNSM producer may take a role of proxy positioned between the telecommunication network Management system and the cloud infrastructure management system (CIMS).

As illustrated in the foregoing discussion, the present disclosure utilizes a variety of terms to describe features and advantages of the systems herein. Additional detail is now provided regarding the meaning of some example terms.

For example, "ETSI NFV MANO" is an ETSI standard that describes the management and orchestration framework required for provisioning VNFs, and the related operations. "CNSM" (or CNSM producer, or CNSM proxy) is a cloud native management system to manage communication between a telecommunication core network and various cloud infrastructure management systems that provide services to authorized users. For example, the CNSM may provide one or more 3GPP defined APIs for a consumer to use. A CNSM may refer to a physical hardware or software-based solution that resides on the telecommunication core network, on the cloud infrastructure side, or it may be a standalone proxy between the two.

"A consumer" (or MnS consumer) may refer to any authorized consumer that is allowed to request services from a service provider on the cloud native management system. For example, a telecommunication network operator may authorize consumer (such as devices in that particular operator's network) to access the telecommunication network operators management services. These authorized consumers are often other management functions within the core network of the telecommunication network, that are authorized to use the services.

In one or more embodiments described herein, a telecommunication network environment may refer to a standardized telecommunication network. The telecommunication network environment may include a radio access network, core network, cloud infrastructure, and any other regions of collections of components that enable consumers to utilize various services of a cloud infrastructure. One or more embodiments described herein refer specifically to a 5G or other 3GPP communication environment. Nevertheless, features described herein in connection with consumer entities, cloud native management entities, and cloud infrastructure management systems may be applicable across a wide variety of communication environments, and are not necessarily limited to the specific 5G or other 3GPP standard environments discussed in connection with specific examples herein.

FIG. 1 illustrates a telecommunication network environment 100 including components of a telecommunication network management system and a cloud infrastructure management system. For example, the telecommunication network environment 100 includes an authorized consumer 102, a server node 108 and a Cloud Native Management System (CNSM) 104 implemented on the server node 108. The server node 108 may include multiple server nodes.

As further shown, the environment 100 may include one or more 3GPP defined APIs 110 that facilitate communication between the consumer 102 and the CNSM 104. As further shown, the environment 100 may include a cloud infrastructure management system (CIMS) 106 in communication with the CNSM 104 via one of a variety of communication mechanisms. For example, the CIMS 106 may communicate with the CNSM 104 via API 112. This API 112 may be de-facto standard API(s) supported by the cloud infrastructure management system (CIMS), proprietary API(s) supported by the CIMS deployment, and/or other standard API(s) defined by ORAN or ETSI or other standardization body supported by the CIMS 106.

As further shown, FIG. 1 depicts the CNSM 104 as a producer in relation to telecommunication network management system consumers 102 and the CIMS 106. As will be discussed in further detail herein, the role of CNSM can be viewed as a proxy, translating the 3GPP defined APIs to the APIs understood by the cloud infrastructure management system among other functionalities.

Figure 2:
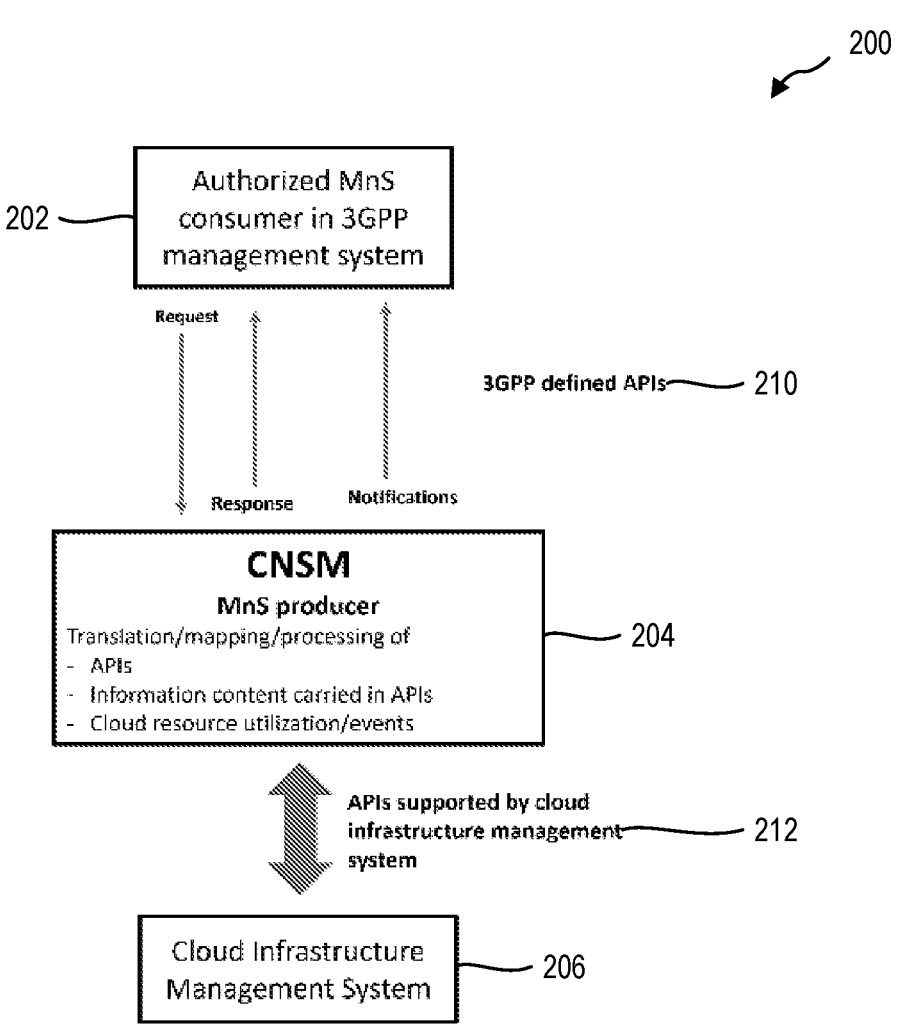
FIG. 2 illustrates another example environment including a CNSM producer implemented on a telecommunication network management system in accordance with one or more embodiments.

FIG. 2 illustrates another example of a telecommunication network environment 200 including many of the same components and features as discussed above in connection with the telecommunication network environment 100 illustrated in FIG. 1. For example, as shown in FIG. 2, an example environment 200 (e.g., a 3GPP telecommunication network environment) may include a telecommunication network management system including an authorized consumer 202 in the telecommunication network management system. As further shown, the example environment 200 may include a CNSM producer 204 (or simply, "CNSM 204") in communication with the authorized consumer 202 via 3GPP defined API(s) 210.

As shown in FIG. 2, and as will be discussed in further detail in connection with examples below, the authorized consumer 202 and the CNSM 204 may transmit various communications to and from one another. For example, the authorized consumer may provide a request for one or more actions to be deployed or that have been previously deployed on the CIMS 206. The CNSM 204 may provide a response to the request including a variety of information related to the request. Further, the CNSM 204 may provide notifications including additional information provided in conjunction with the response and/or subsequent to processing the response. Additional information in connection with examples of these communications will be discussed below.

As further shown in FIG. 2, and as will be discussed in further detail below, the CNSM 204 may provide a variety of features and functionality in connection with facilitating management of CNFs for the authorized consumer 202 and on the CIMS 206. For example, the CNSM 204 may facilitate translation, mapping, and processing of APIs, information content carried in the APIs, and/or cloud-resource utilization/events. As further shown, the CNSM 204 can communicate with the CIMS 206 via one or more APIs 212 supported by the CIMS 206, which may include a variety of API-types as previously discussed in connection with FIG. 1.

Additional detail will now be discussed in connection with features and functionality of the CNSM 204. In one or more embodiments, the CNSM 204 translates 3GPP APIs 210 to cloud infrastructure supported APIs 212. For example, when a communication comes in to the CNSM 204 through one of the 3GPP APIs 210, the CNSM 204 will detect what is in that particular deployment and will translate the request for a CIMS supported API 212.

For example, in one or more implementations, the CNSM 204 interacts with authorized consumer 202 of its services via 3GPP defined service-based interface 210. In addition, in one or more implementations, the CNSM 204 interacts with the cloud infrastructure management system 206 using one of a variety of APIs 212 (as supported by the CIMS).

For instance, in one or more embodiments, the CNSM 204 interacts with the CIMS 206 via a de-facto standard APIs supported by the cloud infrastructure management system. In contrast, the CNSM 204 may interact with the CIMS 206 via proprietary APIs supported by the cloud infrastructure management system deployment. In one or more embodiments, the CNSM 204 interacts with the CIMS 206 via standard APIs defined by ORAN or ETSI or other standardization bodies if supported by the cloud infrastructure management system. In one or more embodiments, the CNSM 204 interacts with the CIMS 206 using a variety of different APIs 212 of the above-mentioned types and standards. It will be noted that the CNSM 204 may already have an established relationship or connection with the CIMS 206 and have negotiated the supported APIs and capabilities prior to carrying out one or more of the acts described herein.

In one or more embodiments, the CNSM 204 maps the information available within telecommunication network management system to the information processable by the cloud infrastructure management and vice versa. This information may be used in either 3GPP or de-facto standard APIs and might not necessarily be understandable or ready to process as-is by the other side. In one or more embodiments, the translation of APIs and mapping of the information is not enough and the CNSM 204 will partially process the APIs or otherwise maintain the required mapping information. Some scenarios where mapping and the additional processing of the information by the CNSM 204 will be discussed in further detail below.

For example, API 210 (e.g., the 3GPP defined APIs) may carry sets of attributes that the API 212 (e.g., the CIMS-supported APIs) does not have, or where the respective APIs 210, 212 have different formats or variations of the data. These differences in the attributes and/or formats will cause the CNSM 204 to perform information mapping for the purpose of translating requests received via one API to be provided via the other API. The information mapping may include, for example, pulling additional data from another server or from the CIMS 206, in order to insert correct information to the set of attributes for the API 212 to understand (e.g., to map information).

In one or more embodiments, the CNSM 204 further translates cloud resource utilization information into 3GPP event instances (or notification triggers). In one or more embodiments, the CNSM 204 has a function associated with the cloud resources (CPU, storage, etc.) utilization. In particular, the CNSM 204 may be responsible for translating events generated by the cloud infrastructure into 3GPP events/data, performance measurements, and fault/alarm/logs. These translated events can be used and made available to data analytics services and other services. For example, a cloud resource may report a 30% CPU usage to the CNSM 204, and the CNSM 204 will translate that resource utilization information into a 3GPP event that the core network (e.g., the consumer) will understand (e.g., high network congestion) based on attributes specific to the corresponding API(s).

In one or more embodiments, the CNSM may perform one or more of the API translation, mapping of information, and translating cloud resource utilization information into 3GPP event instances.

Figure 3:
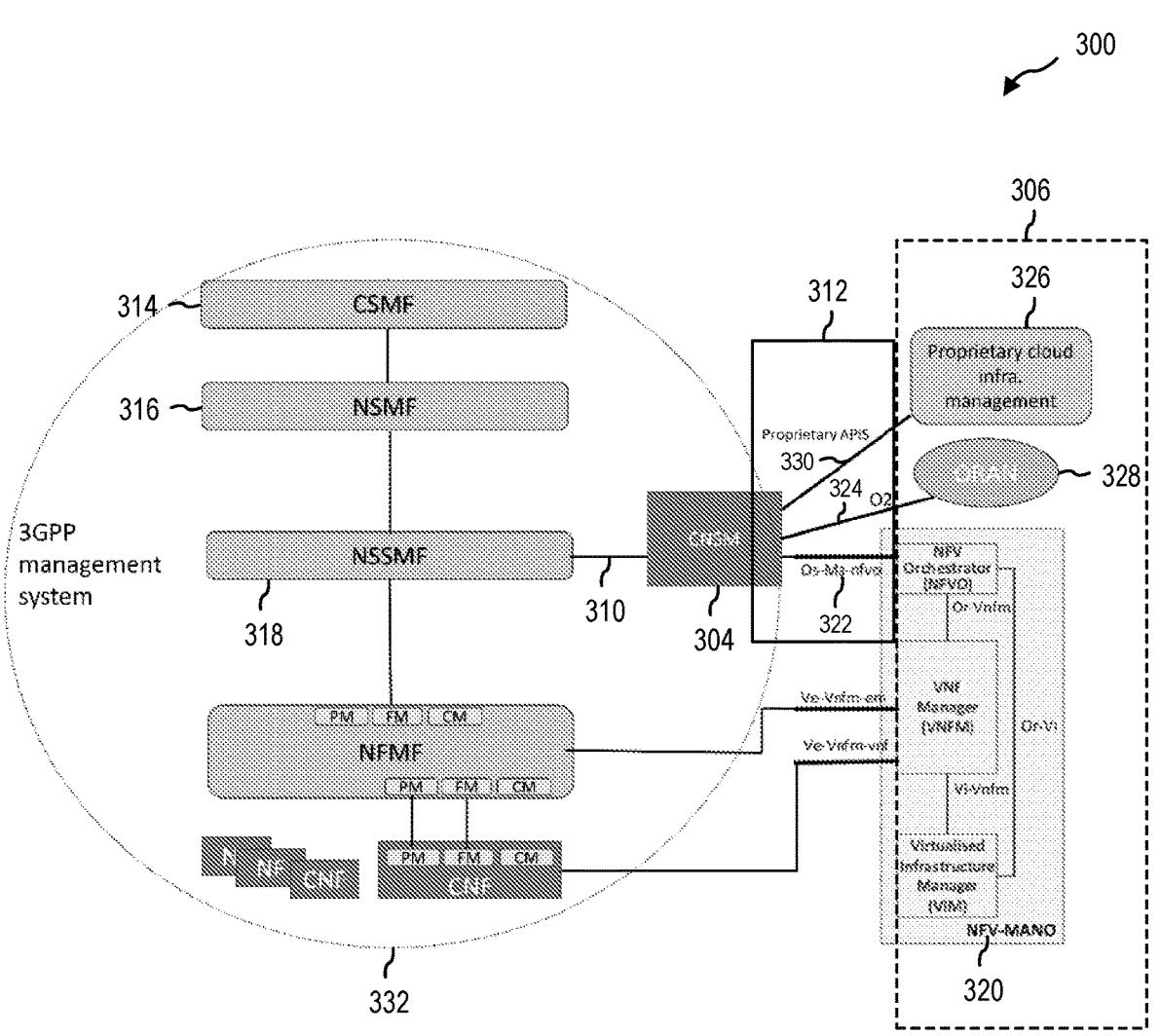
FIG. 3 illustrates a more detailed example environment including a CNSM producer implemented on a telecommunication network management system in accordance with one or more embodiments.

Turning now to FIG. 3, this figure illustrates an example environment 300 showing additional components and features of the telecommunication network management system and cloud infrastructure. As will be discussed in further detail below, various entities shown in FIG. 3 may be specific examples and share features and functionalities of the consumer, CIMS, and CNSM entities discussed above in connection with FIGS. 1-2. Accordingly, one or more features described in connection with the various entities of FIG. 3 may similarly apply to the corresponding components discussed above in connection with FIGS. 1-2 (and vice versa).

3GPP SA5 has recognized the need for automation of management by introducing new management functions such as a communication service management function (CSMF) 314, network slice management function (NSMF) 316, and a network slice subnet management function (NSSMF) 318 to provide an appropriate abstraction level for automation.

The 3GPP SA5 management architecture has adopted a service-oriented management architecture which is described as interaction between consumer (e.g. a management service consumer) and management service provider. For example, a consumer can request operations from management service providers on fault supervision service, performance management service, provisioning service and notification service, etc.

FIG. 3 shows an example CNSM producer 304 (or simply "CNSM 304") in a telecommunication network management system 332 (e.g., a core network) where the consumer of its services is Network Slice Subnet Management Function (NSSMF) 318. In one or more embodiments, the consumer (or an additional consumer) is Network Slice Management Function (NSMF) 316. Indeed, as shown in FIG. 3, the telecommunication environment may include any number of consumer entities in communication with the CNSM 304. As will be discussed below, one or more instances of the CNSM 304 may be deployed on the respective consumer entities.

In one or more embodiments, the CNSM 304 can be deployed as a management function, or as a service within any other management function. In the illustrated example, the CNSM 304 may refer to a standalone management function interacting with either ETSI NFV MANO 320 via Os-Ma-nfvo interface 322, ORAN 328 (Open Radio Access Network) via O2 interface 324, or a proprietary cloud infrastructure management system (PCIMS) 326 via proprietary APIs 330. In one or more embodiments, the CNSM 304 can be deployed as a service producer co-located with NSSMF 318. In one or more embodiments, the CNSM 304 can be implemented as a functionality within cloud infrastructure management system 306. In one or more embodiments, the CNSM 304 can be implemented as a standalone functionality between the telecommunication network management system (e.g., core network) and cloud infrastructure management system.

In one or more embodiments, there may be a separate CNSMs 304 for each of the three management systems (e.g., for PCIMS 326, ORAN 328, and NFV-MANO 320). For example, a first CNSM may be configured to communicate with the PCIMS 326, a second CNSM may be configured to communicate with the ORAN 328, and a third CNSM may be configured to communicate with the ETSI NFV MANO 320. In some embodiments, as shown in FIG. 3, a single CNSM may be configured to communicate with all three systems.

In one or more embodiments, as shown in FIG. 3, there may be only one communication channel 310 (e.g., 3GPP defined API) from the telecommunication network management system 332 to the CNSM 304. For example, all communication to and from the CNSM 304 may travel through the NSSMF 318. In one or more embodiments, there may be several communication channels from the telecommunication network management system 332 to the CNSM 304. For example, there may be first communication channel between the CNSM 304 and the NSSMF 318, and a second communication channel between the CNSM 304 and the NSMF 316.

Additional information will be discussed in connection with a number of example use-cases. These examples are provided by way of example and not limitation. For example, features described in connection with specific examples may be implemented in other examples associated with implementation of one or more embodiments described herein. Indeed, any of the below features in connection with the different example use-cases may be performed in combination with the other example use-cases. In other words, the features and functionality described in connection with specific examples and use-cases may be applicable to one or across multiple implementations of the CNSM.

As a first example related to inquiry about CNF packages, an authorized consumer of the CNSM (e.g., a NF provisioning management service producer which as an example can be a role taken by NSSMF) may inquire availability and/or status of CNF packages in the infrastructure management system. In this example, the CNSM may receive a request for either one time information or subscription for notifications related to CNF packages of one, or multiple NFs. There may be different types of software packages for an NF with different capabilities. The CNSM may maintain a library of the information about different available packages and their capabilities and status (onboarded, active, etc.) or, as a result of receiving the request from an authorized consumer in 3GPP management system, may interact with the cloud infrastructure management to collect that information. The CNSM may then provide that information as a response to the request from authorized consumer (or may provide the information as it becomes available if the authorized consumer is subscribed for notifications).

As a second example related to inquiry about available deployment sites, an authorized consumer in the 3GPP management system (for example NF provisioning management service producer) may inquire about the available deployment sites and their characteristics matching specific criteria. This request for information may be sent to the CNSM. Upon receiving this information, the CNSM may perform one of a variety of responses.

For example, in one or more embodiments, the CNSM may inquire the cloud infrastructure management system (CIMS) directly (by translating the received API to an API supported by CIMS), such as when the CIMS is capable of providing the information based on the information provided in the original inquiry. As another example, the CNSM may map the provided information, in this case the tracking area, to information that is processable by CIMS, for example the geographical area before sending the API as supported by CIMS. As another example, the CNSM may already have the information available based on the capability of maintaining the library of the available sites and their characteristics and status. In each of the above-cases, the CNSM may respond back to the authorized consumer with the information about the available deployment sites and their characteristics and status using APIs to be defined by 3GPP.

As a third example related to instantiation of CNF, in one or more embodiments, the authorized consumer in 3GPP management system (for example NF provisioning management service producer) may request installation of a CNF. This request may include the deployment site and/or the specific package to be used for instantiation or may include neither. If one or both of these pieces of information are not available, upon receipt of the request, the CNSM may perform a variety of functions based on the CIMS policy and capability.

For example, in one or more embodiments, the CNSM may pass on the request to CIMS (using APIs supported by CIMS) and allow CIMS to make the decision about either the deployment site or the flavor of the package to be used or both. As another example, based on the requirements of the NF (required resources and capabilities, etc.) and the characteristics and location of deployment sites and the capabilities of the available packages, the CNSM may decide the best deployment site and/or the package for instantiation of the NF and then request instantiation of the NF from CIMS using the decided parameters. The CNSM may receive the result of instantiation from CIMS using the APIs supported by CIMS and then provide that information to the authorized 3GPP consumer using 3GPP defined APIs.

As a fourth example related to configuration and modification (e.g., scaling and descaling) of a CNF, in one or more embodiments, the authorized consumer in 3GPP management system (for example NF provisioning management service producer) may request configuration of a CNF with specific attributes/parameters. In this scenario, the CNSM may receive these attributes and maps the changes to APIs supported by the CIMS and transmits them to CIMS. After receiving the response APIs, the CNSM may notify the authorized consumer of the result.

Where the CNSM receives request for modification of a CNF, it may have to evaluate whether the modification requires scaling/descaling of the CNF. If it does, then it will invoke the supported APIs for scaling/descaling to CIMS and receive confirmation of the request and its results. The CNSM may then send the result to the authorized consumer of its service.

In one or more embodiments, the CNSM may simply communicate the modification request to the CIMS using APIs supported by the CIMS and let the CIMS decide on scaling/descaling required. In one or more embodiments, the CNSM may receive specific scaling/descaling request for 3 GPP authorized consumer, in which case it will need to transmit the scaling/descaling request to CIMS using APIS supported by CIMS.

As a fifth example related to termination or deletion of CNFs, an authorized consumer in 3GPP management system (for example NF provisioning management service producer) may request termination of a specific CNF instance. In this scenario, the CNSM may receive the termination request and communicates that with CIMS using the APIs supported by CIMS. After receiving the success result for the operation, the CNSM may delete any related information to that CNF and notify the authorized consumer of the result.

As a sixth example related to performance metrics, the CNSM may translate performance metrics associated with cloud resource utilization into 3GPP defined metrics for authorized consumers.

As a seventh example related to processing faults and alarms, the CNSM may map faults and alarms generated by the cloud infrastructure to 3GPP events and notifications. The CNSM may then provide data associated with the events/notifications to an authorized consumer (e.g., the Management Data Analytics Function (MDAF)).

The features and functionalities described herein provide a number of advantages and benefits over conventional approaches and systems. For example, features of one or more embodiments described herein provide a solution based on SBMA that builds on existing solutions in 3GPP. As another example, features of one or more embodiments described herein support a variety of cloud-native management solutions and enables seamless integration of them with 3GPP management systems. As a further example, features of one or more embodiments described herein do not rely on ETSI NFV MANO standards which is often heavy with high-overhead and has gaps when it comes to management of cloud native NFs as opposed to VNFs. As a yet another example, instead of having to use various different ETSI or cloud infrastructure-based APIs, the CNSM provides a single standardized API that authorized consumers can use to communicate with the CIMS.

Figure 4:
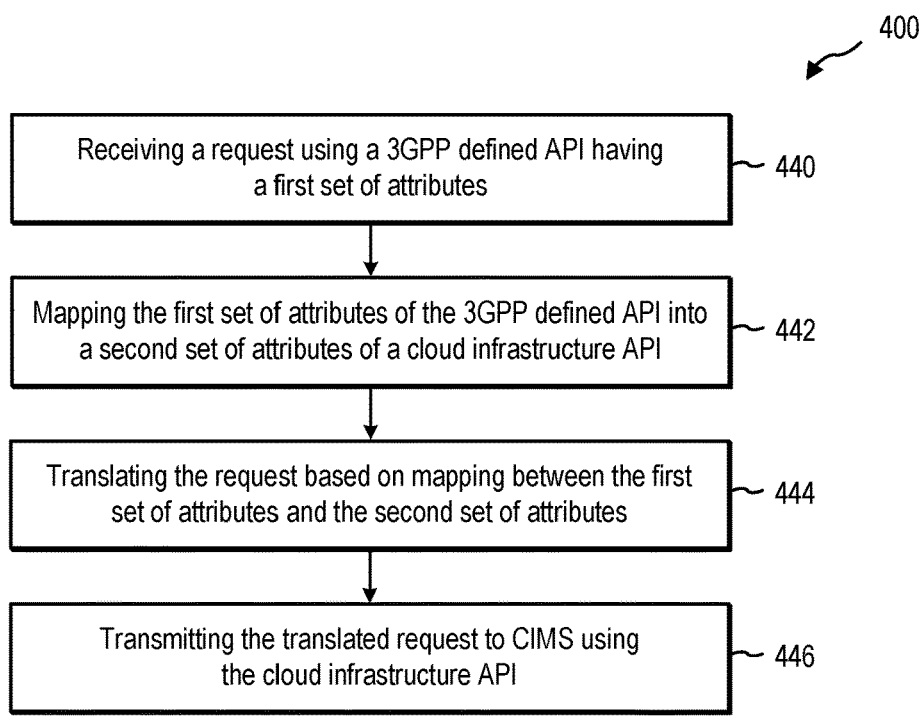
FIG. 4 illustrates a method for providing telecommunication network management services in a cloud-native management system in accordance with one or more embodiments.
Figure 5:
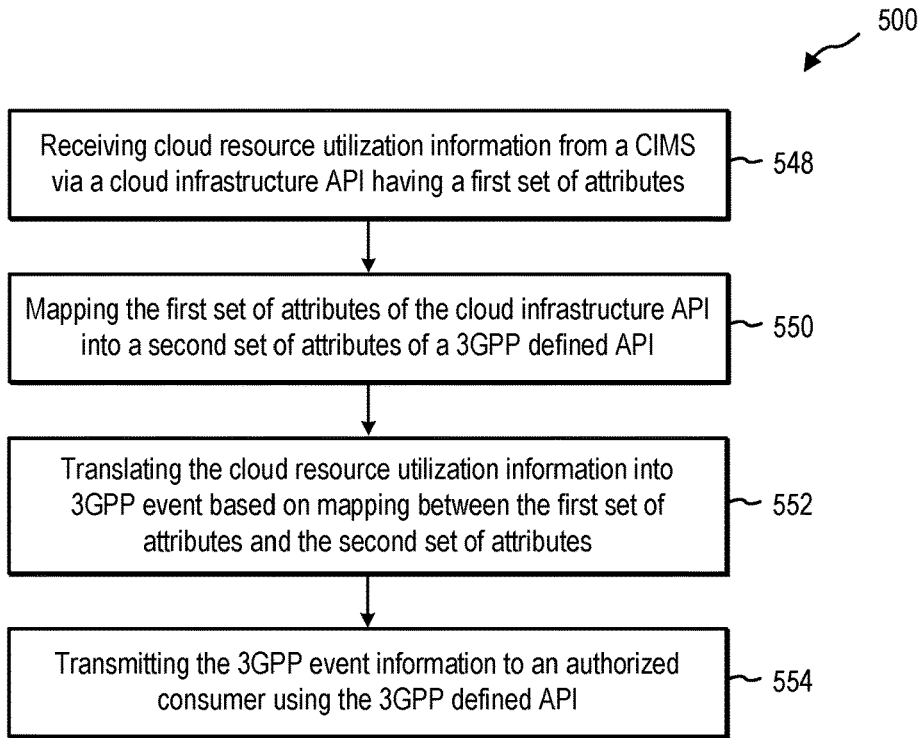
FIG. 5 illustrates another method for providing telecommunication network management services in a cloud-native management system in accordance with one or more embodiments.

Turning now to FIGS. 4-5, these figures illustrate example flowcharts including series of acts for providing telecommunication network management services in a cloud-native management system in accordance with one or more embodiments. It will be appreciated that acts described herein may be performed in different orders and may include some or all of the acts described in connection with different examples. The acts described herein may be performed as part of a method. In one or more embodiments, a non-transitory computer-readable medium can include instructions thereon that, when executed by one or more processors, cause a server device and/or client device to perform the acts described herein. In one or more embodiments, a system can perform the acts described herein.

FIG. 4 illustrates a series of acts 400 for providing telecommunication network management services in a cloud-native management system in accordance with one or more embodiments. As shown in FIG. 4, the series of acts 400 may include an act 440 of receiving a request using a 3GPP defined API having a first set of attributes. In one or more embodiments, the act 440 involves receiving a request from an authorized consumer, the request being received using a third generation partnership project (3GPP) defined application programming interface (API) having a first set of attributes.

As further shown in FIG. 4, the series of acts 400 may include an act 442 of mapping the first set of attributes of the 3GPP defined API into a second set of attributes of a cloud infrastructure API. As further shown in FIG. 4, the series of acts 400 may include an act 444 of translating the request based on based on the mapping of the first set of attributes and the second set of attributes. As further shown in FIG. 4, the series of acts 400 may include an act 446 of transmitting the translated request to a CIMS using the cloud infrastructure API.

In one or more embodiments, the CNSM is a proxy positioned between the authorized consumer and the CIMS. In one or more embodiments, the CNSM is implemented as a standalone device located within a telecommunication network. In one or more embodiments, the CNSM implemented as a service on the authorized consumer. In one or more embodiments, the authorized consumer is a network slice subnet management function (NSSMF). In one or more embodiments, the CNSM is implemented as a functionality within the CIMS. In one or more embodiments, the CNSM is a service deployed as a management function or as a feature incorporated within another management function.

In one or more embodiments, the series of acts includes an act of receiving cloud resource utilization information in response to the request from the CIMS. In this example, the cloud resource utilization information may be translated into 3GPP event instances. In one or more embodiments, the 3GPP event instances include performance measurements, faults, alarms, and/or logs.

In one or more embodiments, the cloud infrastructure API is a de-facto standard API supported by a cloud infrastructure. The cloud infrastructure API may also be a proprietary API supported by the cloud infrastructure. The cloud infrastructure API may also be a standard API adopted by at least one development body.

In one or more embodiments, the request is an inquiry of availability and/or status of cloud-native virtual network functions (CNF) packages in the CIMS. The request may also be an inquiry of available deployment sites and their characteristics matching a special criteria. The request may also be request of installation of a CNF. The request may also be a request of configuration of a CNF with specific parameters.

FIG. 5 illustrates another series of acts 500 for providing telecommunication network management services in a cloud-native management system in accordance with one or more embodiments. As shown in FIG. 5, the series of acts 500 may include an act 548 of receiving cloud resource utilization information from a CIMS via a cloud infrastructure API having a first set of attributes. In one or more embodiments, the act 548 involves receiving cloud resource utilization information from a cloud infrastructure management system (CIMS), the cloud resource utilization information being received via a cloud infrastructure application programming interface (API) having a first set of attributes.

In one or more embodiments, the series of acts 500 includes an act 550 of mapping the first set of attributes of the cloud infrastructure API into a second set of attributes of a 3GPP defined API. The series of acts 500 may further include an act 552 of translating the cloud resource utilization information into 3GPP event information based on the mapping between the first set of attributes and the second set of attributes. The series of acts 500 may further include an act 554 of transmitting the 3GPP event information to an authorized consumer using the 3GPP defined API. In one or more embodiments, the act 554 involves transmitting the 3GPP event information translated from the cloud resource utilization information to an authorized consumer using the 3GPP defined API.

Consistent with one or more embodiments described herein, the 3GPP event information may include performance measurements, faults, alarms, and/or logs. In one or more embodiments, the 3GPP event information is transmitted to an authorized consumer using the 3GPP defined API. In one or more embodiments, the authorized consumer is located in a core network of a telecommunication network. In one or more embodiments, the authorized consumer has an active subscription for receiving event information from the CIMS. In one or more embodiments, the series of acts includes receiving a request to terminate the active subscription.

Figure 6:
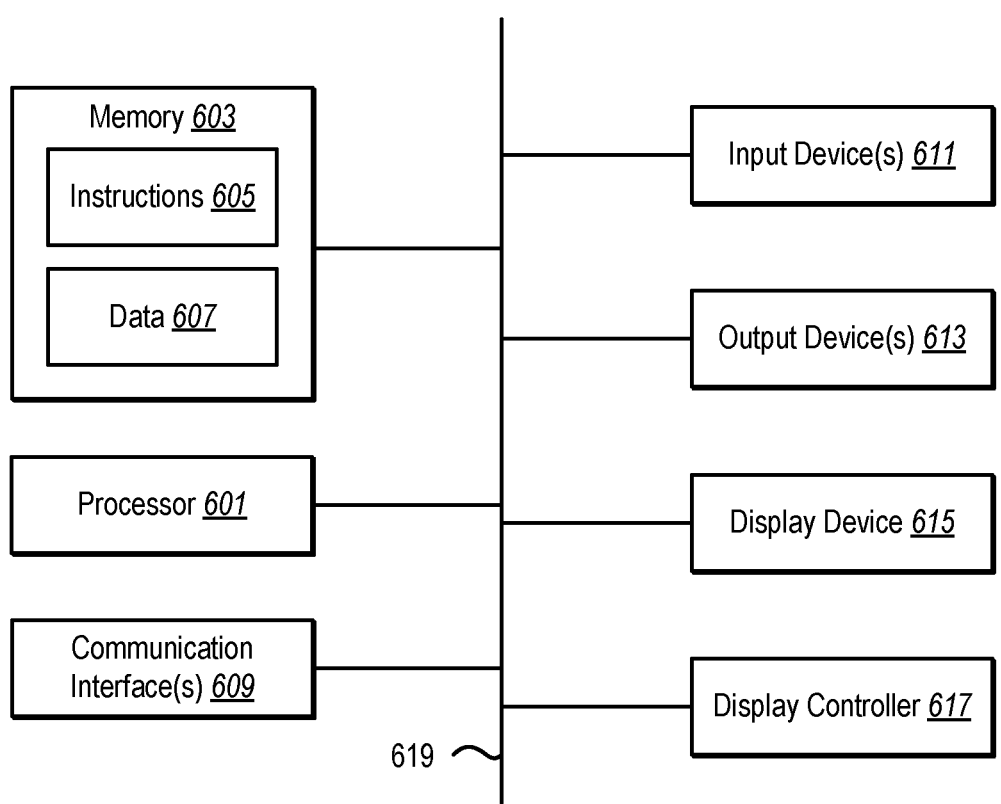
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing telecommunication network management services in a cloud-native management system (CNSM), the CNSM acting as a proxy between an authorized consumer and a cloud infrastructure management system (CIMS), comprising:

receiving a request from the authorized consumer, the request being received using a third generation partnership project (3GPP) defined application programming interface (API) having a first set of attributes, wherein the request is related to deployment or management of a cloud-native virtual network function (CNF);

mapping the first set of attributes of the 3GPP defined API to a second set of attributes of a cloud infrastructure API;

determining, at the CNSM and based on characteristics of one or more available CNF packages accessible through the CIMS, at least one parameter for the request, the at least one parameter including one or more of a deployment site to be used for the CNF, a CNF package of the one or more available CNF packages to be used for instantiation of the CNF, or whether modification of the CNF requires scaling or descaling;

translating the request based on the mapping of the first set of attributes and the second set of attributes, including translating cloud resource utilization information received from the CIMS into 3GPP event instances, the 3GPP event instances including one or more of performance measurements, faults, alarms, or logs; and transmitting the translated request including the at least one determined parameter to the CIMS using the cloud infrastructure API.

2. The method of claim 1, wherein the CNSM is implemented in a core network of a fifth generation (5G) telecommunication network as a standalone proxy positioned between multiple authorized consumers and the CIMS.

3. The method of claim 1, wherein the CNSM is implemented as a standalone device located within a telecommunication network.

4. The method of claim 1, wherein the CNSM is implemented as a service on the authorized consumer.

5. The method of claim 4, wherein the authorized consumer is a network slice subnet management function (NSSMF).

6. The method of claim 1, wherein the CNSM is implemented as a functionality within the CIMS.

7. The method of claim 1, wherein the cloud infrastructure API is at least one of:

a de-facto standard API supported by a cloud infrastructure;

a proprietary API supported by the cloud infrastructure; or a standard API adopted by at least one development body.

8. The method of claim 1, wherein determining at least one parameter for the request includes determining the parameter without relying on an orchestration layer of the CIMS.

9. The method of claim 1, wherein determining at least one parameter for the request includes determining the parameter without relying on an ETSI NFV MANO framework of the CIMS.

10. A method for providing telecommunication network management services in a cloud-native management system (CNSM), the CNSM acting as a proxy between an authorized consumer and a cloud infrastructure management system (CIMS), comprising:

receiving cloud resource utilization information from a cloud infrastructure management system (CIMS), the cloud resource utilization information being received via a cloud infrastructure application programming interface (API) having a first set of attributes, wherein the cloud resource utilization information is related to a request for deployment or management of a cloud-native virtual network function (CNF); and at the CNSM:

determining, based on characteristics of one or more available CNF packages accessible through the CIMS, at least one parameter for the request, the at least one parameter including one or more of a deployment site to be used for the CNF, a CNF package of the one or more available CNF packages to be used for instantiation of the CNF, or whether modification of the CNF requires scaling or descaling;

mapping the first set of attributes of the cloud infrastructure API to a second set of attributes of a third generation partnership project (3GPP) defined API;

translating the cloud resource utilization information into 3GPP event information based on the mapping between the first set of attributes and the second set of attributes, the 3GPP event information including one or more of performance measurements, faults, alarms, or logs; and transmitting the 3GPP event information translated from the cloud resource utilization information to an authorized consumer using the 3GPP defined API.

11. The method of claim 10, wherein the 3GPP event information is transmitted to an authorized consumer using the 3GPP defined API.

12. The method of claim 11, wherein the authorized consumer is located in a core network of a fifth generation (5G) telecommunication network.

13. The method of claim 11, wherein the authorized consumer has an active subscription for receiving event information from the CIMS.

14. The method of claim 13, further including receiving a request to terminate the active subscription.

15. A system, comprising:

at least one processor;

memory in electronic communication with the at least one processor; and instructions stored in the memory, the instructions being executable by the at least one processor to cause a cloud native management system (CNSM) to:

receive, at the CNSM, a request from an authorized consumer, the request being received using a third generation partnership project (3GPP) defined application programming interface (API) having a first set of attributes, the CNSM acting as a proxy positioned between the authorized consumer and a cloud infrastructure management system (CIMS), wherein the request is related to deployment or management of a cloud-native virtual network function (CNF);

map the first set of attributes of the 3GPP defined API to a second set of attributes of a cloud infrastructure API;

determine, at the CNSM and based on characteristics of one or more available CNF packages accessible through the CIMS, at least one parameters for the request, the at least one parameter including one or more of a deployment site to be used for the CNF, a CNF package of the one or more available CNF packages to be used for instantiation of the CNF, or whether modification of the CNF requires scaling or descaling;

translate the request based on the mapping of the first set of attributes to the second set of attributes, including translating cloud resource utilization information received from the CIMS into 3GPP event instances, the 3GPP event instances including one or more of performance measurements, faults, alarms, or logs; and transmit the translated request including the at least one determined parameter to the CIMS using the cloud infrastructure API.

16. The system of claim 15, wherein the authorized consumer is a network slice subnet management function (NSSMF).

17. The system of claim 15, wherein the CNSM is implemented as at least one of:

a standalone device located within a telecommunication network;

a service provider co-located within the authorized consumer in a telecommunication network; or a functionality within the CIMS.

* * * * *